United States Patent
Suri

(10) Patent No.: US 10,191,737 B2
(45) Date of Patent: Jan. 29, 2019

(54) PROGRAM CODE COMPARISON AND REPORTING

(71) Applicant: Accenture Global Solutions Limited, Dublin (IE)

(72) Inventor: Siddharth Suri, Woodlands Hills, CA (US)

(73) Assignee: Accenture Global Solutions Limited, Dublin (IE)

( * ) Notice: Subject to any disclaimer, the term of this patent is extended or adjusted under 35 U.S.C. 154(b) by 191 days.

(21) Appl. No.: 15/197,156

(22) Filed: Jun. 29, 2016

(65) Prior Publication Data

US 2018/0004508 A1  Jan. 4, 2018

(51) Int. Cl.
| | |
|---|---|
| G06F 9/44 | (2018.01) |
| G06F 8/75 | (2018.01) |
| G06F 8/36 | (2018.01) |
| G06F 8/20 | (2018.01) |
| G06F 8/71 | (2018.01) |

(52) U.S. Cl.
CPC ............... *G06F 8/75* (2013.01); *G06F 8/20* (2013.01); *G06F 8/36* (2013.01); *G06F 8/71* (2013.01)

(58) Field of Classification Search
CPC ......... G06F 17/30914; G06F 17/30286; G06F 8/20; G06F 8/70; G06F 8/36; G06F 8/75; G05B 19/0426
IPC ..................................................... G06F 8/75
See application file for complete search history.

(56) References Cited

U.S. PATENT DOCUMENTS

| | | | |
|---|---|---|---|
| 3,711,836 A | 1/1973 | Bloom | |
| 3,711,863 A | 1/1973 | Bloom | |
| 5,632,041 A | 5/1997 | Peterson et al. | |
| 6,449,624 B1* | 9/2002 | Hammack | G05B 19/0426 |
| 6,654,950 B1* | 11/2003 | Barnishan | G06F 8/20 |
| | | | 717/136 |
| 2003/0149934 A1* | 8/2003 | Worden | G06F 17/30914 |
| | | | 715/239 |
| 2004/0153469 A1* | 8/2004 | Keith-Hill | G06F 17/30286 |
| 2004/0221270 A1 | 11/2004 | Witchel et al. | |

(Continued)

FOREIGN PATENT DOCUMENTS

WO   WO 2012/079230   6/2012

OTHER PUBLICATIONS

Informatica, "Informatica PowerCenter Express (Version 9.5.1): User Guide," https://marketplace.informatica.com/mpresources/docs/PCX_951_UserGuide_en.pdf, 227 pages, May 2013.

*Primary Examiner* — Tuan A Vu
(74) *Attorney, Agent, or Firm* — Harrity & Harrity, LLP

(57) ABSTRACT

A device may include one or more processors. The device may obtain a first code set and a second code set. The first code set may have at least one difference from the second code set. The at least one difference may relate to addition, removal, or modification of code of the first code set in comparison to code of the second code set. The device may identify one or more first portions of the first code set and one or more second portions of the second code set. The device may concurrently compare the one or more first portions and the one or more corresponding second portions to identify the at least one difference. The device may generate comparison information identifying the at least one difference. The device may store or provide the comparison information.

20 Claims, 9 Drawing Sheets

(56) References Cited

U.S. PATENT DOCUMENTS

| | | | |
|---|---|---|---|
| 2011/0320413 A1* | 12/2011 | Roman | G06F 8/70 |
| | | | 707/690 |
| 2012/0159434 A1* | 6/2012 | Dang | G06F 8/36 |
| | | | 717/120 |
| 2013/0179867 A1 | 7/2013 | Fritter et al. | |
| 2013/0243325 A1 | 9/2013 | Bradbury et al. | |
| 2013/0262443 A1 | 10/2013 | Leida et al. | |
| 2014/0173559 A1 | 6/2014 | Tiwari | |

* cited by examiner

FIG. 5C

| Action | Program Name | Transformation Name | Transformation Type | Value Name | Value | Data Type | Expression |
|---|---|---|---|---|---|---|---|
| MODIFICATION | s_Dummy_Code | SQ_Dummy | Source Qualifier | SQL Query | Select Total, Type from DummyTable; | Blank | Blank |
| MODIFICATION | s_Dummy_Code | exp_Dummy | Expression | Blank | Blank | decimal | V_Dummy |
| MODIFICATION | s_Dummy_Code | exp_Dummy | Expression | Blank | Blank | decimal | IIF(v_Dummy=0, v_Dummy1, NULL) |
| ADDITION | s_Dummy_Code | SQ_Dummy | Source Qualifier | Blank | Blank | string | Blank |
| ADDITION | s_Dummy_Code | exp_Dummy | Expression | Blank | Blank | decimal | IIF(i_Dummy='DMY' or (i_Dummy <> 'DMY' AND (IN (i_Dummy, 'D', 'Y'))), Dummy,0) |

SESSION SHORTCUT MAPPING

TRANSFORMATION

PROGRAM CODE COMPARISON AND REPORTING

BACKGROUND

Software may be developed in multiple environments or lifecycle stages (e.g., a development environment, a testing environment, a user acceptance environment, etc.). A software developer may make changes (e.g., additions, deletions, and/or modifications to code) at each stage of the software development lifecycle. For example, the software developer may modify the software based on feedback from a client, based on changing requirements for the software, or the like.

SUMMARY

A device may include one or more processors. The one or more processors may obtain a first code set and a second code set. The first code set may have at least one difference from the second code set. The at least one difference may relate to addition, removal, or modification of code of the first code set in comparison to code of the second code set. The first code set and the second code set may relate to extracting input data from a source file, transforming the input data to form output data, or storing the output data in a target file. The one or more processors may identify one or more first portions of the first code set and one or more second portions of the second code set. Each first portion, of the one or more first portions, may be compared to a corresponding second portion of the one or more second portions. The one or more processors may concurrently compare the one or more first portions and the one or more corresponding second portions to identify the at least one difference. The one or more processors may generate comparison information identifying the at least one difference. The one or more processors may store or provide the comparison information.

A non-transitory computer-readable medium may store one or more instructions that, when executed by one or more processors, may cause the one or more processors to receive a first code set and a second code set. The first code set may include one or more differences in comparison with the second code set. The one or more differences may relate to addition, removal, or modification of code of the first code set in comparison to code of the second code set. The one or more instructions, when executed by one or more processors, may cause the one or more processors to identify one or more first portions included in the first code set and one or more second portions included in the second code set. Each first portion, of the one or more first portions, may be compared with a corresponding second portion of the one or more second portions. The one or more instructions, when executed by one or more processors, may cause the one or more processors to concurrently compare the one or more first portions and the one or more second portions to identify the one or more differences. The one or more instructions, when executed by one or more processors, may cause the one or more processors to generate comparison information identifying the one or more differences. The one or more instructions, when executed by one or more processors, may cause the one or more processors to store or provide the comparison information.

A method may include obtaining, by a device, a first code set and a second code set. The first code set may include one or more differences in comparison with the second code set. The first code set and the second code set may relate to extracting input data from a source file, transforming the input data to form output data, or storing the output data in a target file. The method may include identifying, by the device, one or more first portions included in the first code set and one or more second portions included in the second code set. Each first portion, of the one or more first portions, may be compared with a corresponding second portion of the one or more second portions. The method may include concurrently comparing, by the device, the one or more first portions and the one or more second portions. The method may include identifying, by the device, the one or more differences based on comparing the one or more first portions and the one or more second portions. The method may include generating, by the device, comparison information identifying the one or more differences. The method may include storing or providing, by the device, the comparison information.

BRIEF DESCRIPTION OF THE DRAWINGS

FIGS. 5A-5C are diagrams of an example implementation relating to the example process shown in FIG. 4.

DETAILED DESCRIPTION

Figure 1A:
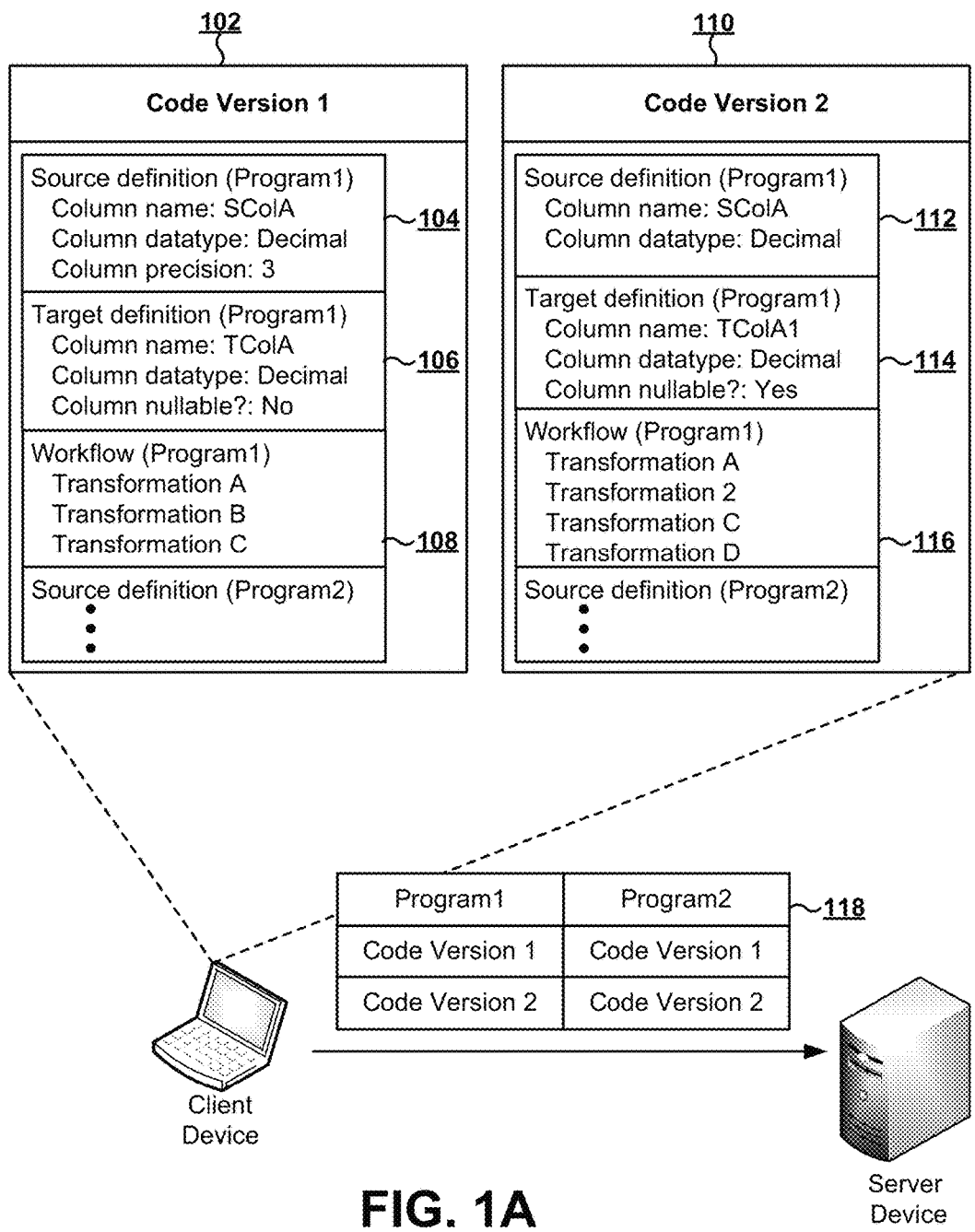
FIGS. 1A-1C are diagrams of an overview of an example implementation described herein.

The following detailed description of example implementations refers to the accompanying drawings. The same reference numbers in different drawings may identify the same or similar elements.

A user (e.g., a computer programmer, a software developer, or the like) may generate or develop program code based on a set of requirements. During development, the user may modify the program code to better fit the set of requirements, or to fit a different (e.g., changing) set of requirements. As one example, the program code may relate to data management (e.g., data transformation, data processing, data analysis, etc.) using a platform such as Informatica PowerCenter®. As another example, the program code may relate to an Extract, Transform, and Load (ETL) process for extracting input data from a source object (e.g., a source file, a source directory, a source data structure, etc.), performing actions or transformations on the input data to form output data, and loading the output data to a target object (e.g., a target file, a target directory, a target data structure, etc.). When the set of requirements for the program code changes, the user may need to update multiple, different portions of the program code, and/or may need to update other program code, to fit the updated requirements. Also, the user may need to generate or provide documentation of changes to the program code (e.g., to a client, an end-user, or the like).

Implementations described herein may compare two sets of program code and identify a difference (e.g., an addition, a deletion, and/or a modification of code) between the two sets of program code. In some implementations, implementations described herein may identify corresponding portions of program code in the code sets (e.g., source definition portions, transformation portions, target definition portions, etc.), and may compare the corresponding portions. Additionally, or alternatively, multiple portions of two sets of program code may be received as input, and the multiple portions may be concurrently compared. Additionally, or alternatively, multiple pairs of code sets may be received (e.g., corresponding to multiple, different programs), and each of the multiple pairs may be compared (e.g., a first code set and a second code set of a first pair may be compared, a first code set and a second code set of a second pair may be compared, and so on).

Additionally, or alternatively, comparison information (e.g., a code comparison report) may be prepared to identify the differences and/or information relating to the differences. In some implementations, the comparison information may be used to perform an action (e.g., inserting code comments in code to identify the differences, adding, moving, or deleting parts of program code based on the differences, etc.).

In this way, a quantity of errors in program code is reduced, thereby improving performance of the program code and conserving processor resources. Additionally, by receiving multiple portions of code as input and concurrently comparing the multiple portions, processor resources are saved that would otherwise be used to individually or non-concurrently compare each of the multiple portions. Further, processing resources are conserved that would otherwise need to be used to generate and/or debug working code in the event that these techniques are not applied. Still further, implementations described herein may result in faster processing of code based on the code including fewer errors.

While implementations described herein are primarily described in terms of code relating to data processing and ETL processing, implementations described herein are not limited to data processing and ETL processing. For example, implementations described herein may be applied to code that can be used for any purpose (e.g., communications, gaming, management, or the like).

Figure 1B:
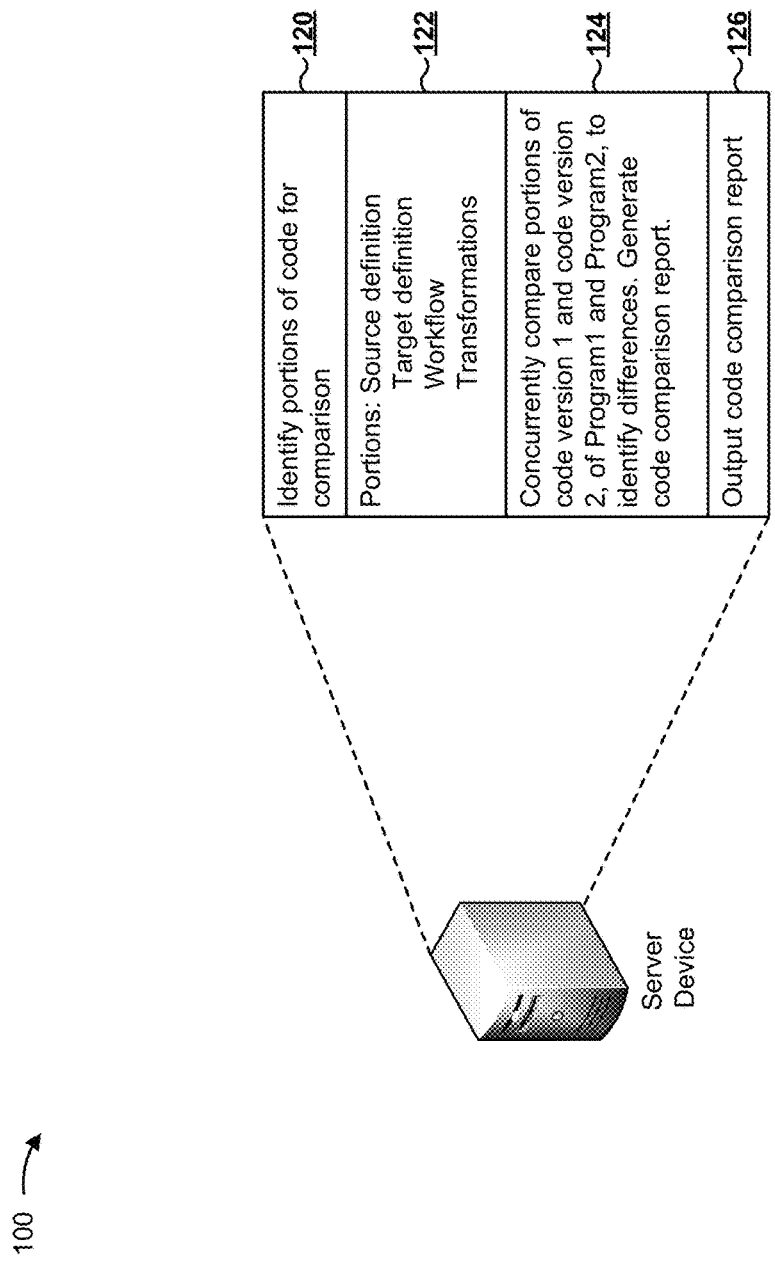
Figure 1C:
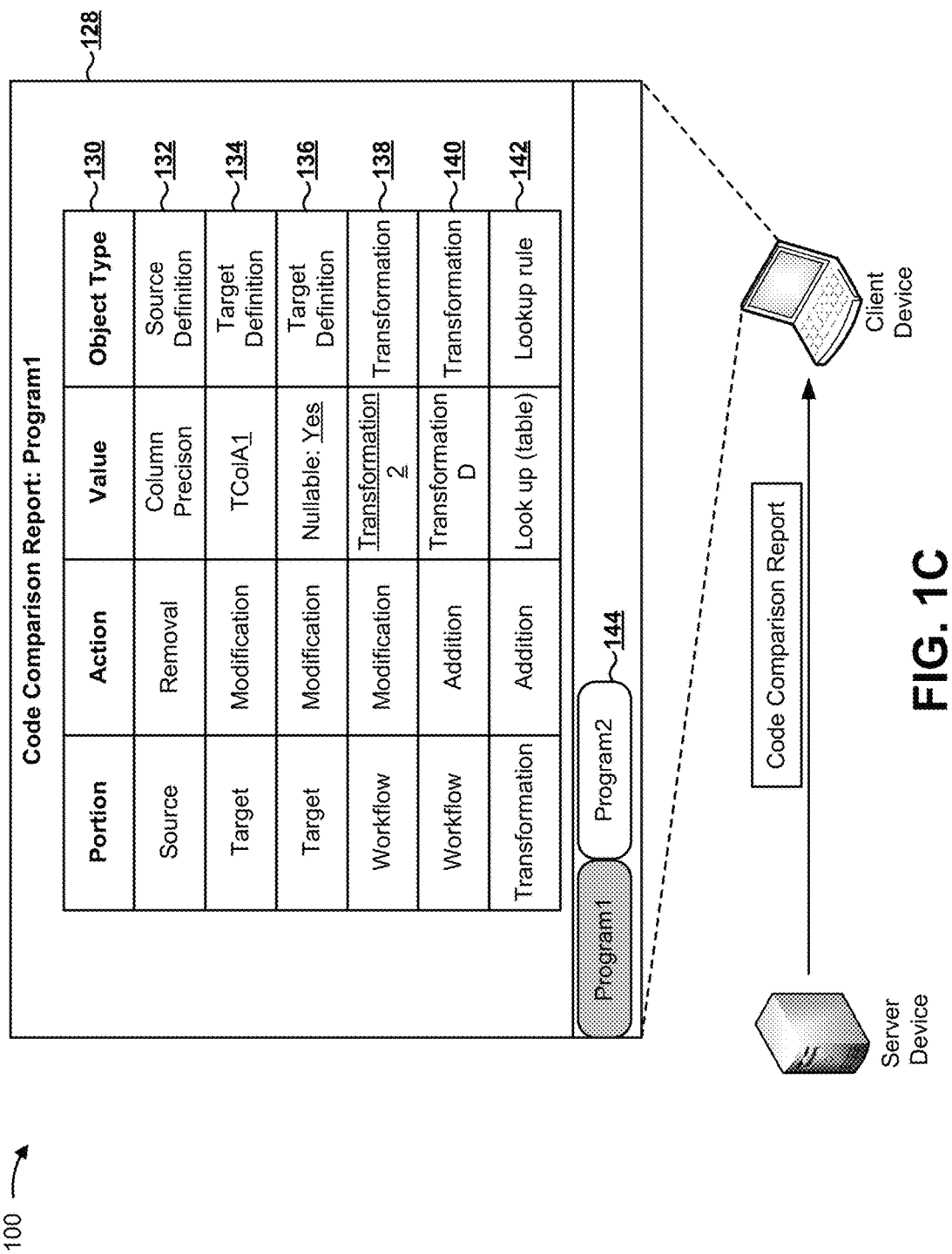

FIGS. 1A-1C are diagrams of an overview of an example implementation 100 described herein. FIG. 1A shows two example programs (e.g., Program1 and Program2). Each program is associated with two code sets (e.g., code version 1 and code version 2) that are to be compared to identify differences between the two code sets. For example, code version 1 may be an original version of one of the programs, and code version 2 may be a modified version of the one of the programs. As shown in FIG. 1A, and by reference number 102, code version 1 of Program1 may include a source definition portion 104, which may include code relating to a source of data to be processed based on the code set. For example, source definition portion 104 may include a column name (e.g., SColA), a column data type (e.g., Decimal) and a column precision (e.g., 3). As shown by reference number 106, code version 1 of Program1 may include a target definition portion 106, which may include code relating to a target or destination for the data after the data is processed. For example, target definition portion 106 may include a column name (e.g., TColA), a column datatype (e.g., Decimal) and a column nullability indicator (e.g., "No," indicating that a corresponding column is not permitted to include a null value).

As shown by reference number 108, code version 1 of Program1 may include a workflow portion, which may identify transformations to be applied to the data to process the data. For example, workflow portion 108 may identify transformations of Transformation A, Transformation B, and Transformation C. Each transformation may be associated with a corresponding rule or operation based on which the data is to be processed, as described in more detail elsewhere herein.

As further shown, code version 1 of Program2 may include a source definition portion, which may include values similar to those identified above. Assume that the ellipsis in FIG. 1A indicates that Program2 may include one or more other portions similar to those included in Program1, such as a target definition portion, a workflow portion, one or more transformations, or the like.

As further shown in FIG. 1A, and by reference number 110, code version 2 of Program1 may include a source definition portion 112 corresponding to source definition portion 104 of code version 1. As shown, source definition portion 112 includes a modification of a value included in source definition portion 104 (e.g., the removal of the "Column precision" value or object).

As shown by reference number 114, code version 2 of Program1 includes a target definition portion 114 corresponding to target definition portion 106 of code version 1. As further shown in FIG. 1A, target definition portion 114 includes a modification of the values included in target definition portion 106 (e.g., a modification of the column name value from "TColA" to "TColA1," and a modification of the column nullability indicator from a value of "No" to a value of "Yes"). As shown by reference number 116, code version 2 of Program1 includes a workflow portion corresponding to the workflow portion 108 of code version 1. As further shown in FIG. 1A, workflow portion 116 of Program1 includes a modification of a value included in workflow portion 108 (e.g., the addition of Transformation 2).

As further shown, code version 2 of Program2 may include a source definition portion, which may include values similar to those identified above. Assume that the ellipsis in FIG. 1A indicates that code version 2 of Program2 may include one or more other portions similar to those included in code version 2 of Program1, such as a target definition portion, a workflow portion, one or more transformations, or the like.

As shown by reference number 118, a client device may provide the code sets of the two programs to a server device to be compared. For example, the client device may receive the two code sets (e.g., from another device, based on a user input, etc.), and may provide the two code sets to the server device. In some implementations, the server device may obtain the two code sets from storage, may receive the two code sets from another device other than the client device, or the like. In some implementations, the server device may provide the two code sets to the client device, and the client device may perform the operations described in connection with FIGS. 1B and 1C, which conserves processor resources of the server device. In some implementations, the server device may combine Program1 and Program2, and may concurrently compare Program1 and Program2, as described in more detail elsewhere herein. For example, the server device may concatenate Program1 and Program2, may concatenate corresponding portions of Program1 and Program2 (e.g., may concatenate a source definition portion of Program1 and a source definition portion of Program2), or the like.

As shown in FIG. 1B, and by reference number 120, the server device may identify the portions of code to be compared. For example, the server device may identify the portions of code based on metadata identifying the portions, based on user input identifying the portions, based on functions included in the portions, or the like. As shown by reference number 122, the server device may identify the source portions, the target definition portions, the workflow portions, and the transformation portions.

As shown by reference number 124, the server device may compare the portions between code version 1 and code version 2 to identify the differences between code version 1 and code version 2. For example, the server device may concurrently identify differences between code versions 1 and 2 of Program1, and between code versions 1 and 2 of Program2. As shown by reference number 126, the server device may output a code comparison report based on the comparison. The code comparison report is described in more detail with regard to FIG. 1C and FIGS. 5A-5C.

As shown in FIG. 1C, the server device may provide the code comparison report to the client device. FIG. 1C primarily shows the code comparison report corresponding to code versions 1 and 2 of Program1. Assume that a similar code comparison report is generated for code versions 1 and 2 of Program2. As shown by reference number 128, the client device may provide the code comparison report for display. As shown by reference number 130, for each difference between the two code sets, the code comparison report may identify a portion of code in which the different was found (e.g., source definition, target definition, workflow, etc.), an action performed on the portion of code that resulted in the difference (e.g., an addition, a removal, or a modification), a value associated with the action (e.g., column precision, TColA1, nullability indicator, transformation, lookup table, etc.), and an object type associated with the value (e.g., source definition, target definition, transformation, lookup rule, variable, function, etc.).

The code comparison report may include multiple entries or rows corresponding to differences, as shown by reference numbers 132 through 142. As further shown, each row may identify the portion of the code that includes the difference, an action associated with the difference (e.g., removal, addition, or modification), a value that was modified, and an object type associated with the value that was modified. As described herein, a value may include a specific string, function, variable value, or the like. An object type may identify a category or type associated with the value and/or an object included in the portion. For example, the portion may include objects that define data types and/or operations to perform with regard to variables, and the object type may identify categories or types associated with the objects.

As shown by reference number 132, the code comparison report identifies a removal of a source definition value (e.g., Column Precision) from the source definition portion of the code. As shown by reference number 134, the code comparison report identifies a modification of a target definition value (e.g., to TColA1) in the target definition portion of the code. As shown, the "1" of TColA1 may be underlined based on the "1" being an addition to the program code. As shown by reference number 136, the code comparison report identifies a modification of a target definition value (e.g., a nullability indicator being modified to a value of Yes) in the target definition portion of the code. As shown, the nullability indicator may be underlined based on the nullability indicator being modified between the first code set and the second code set. As shown by reference number 138, the code comparison report identifies a modification of a transformation value (e.g., to Transformation 2) in the workflow portion of the code. As shown, the transformation value may be underlined based on the transformation value being modified between the first code set and the second code set. As shown by reference number 140, the code comparison report identifies an addition of a transformation (e.g., Transformation D) to the workflow portion of the code. As shown by reference number 142, the code comparison report identifies an addition of an operation (e.g., Look up (table)) to a transformation included in the code. As shown by reference number 144, the code comparison report may include a graphical user interface (GUI) element to cause the client device to provide, for display, comparison information relating to Program2. Based on detecting an interaction (e.g., a user interaction) with the element, the client device may provide, for display, the comparison information relating to Program2.

In this way, a quantity of errors in program code is reduced, thereby improving performance of the program code and conserving processor resources. Additionally, by receiving multiple portions of code as input and concurrently comparing the multiple portions, processor resources are saved that would otherwise be used to individually or non-concurrently compare each of the multiple portions. Further, processing resources are conserved that would otherwise need to be used to generate and/or debug working code in the event that these techniques are not applied. Still further, implementations described herein may result in faster processing of code based on the code including fewer errors. Even further, implementations described herein may concurrently compare program code from multiple, different programs, thereby reducing user effort in understanding and debugging differences between versions of the multiple, different programs.

As indicated above, FIGS. 1A-1C are provided merely as an example. Other examples are possible and may differ from what was described with regard to FIGS. 1A-1C.

Figure 2:
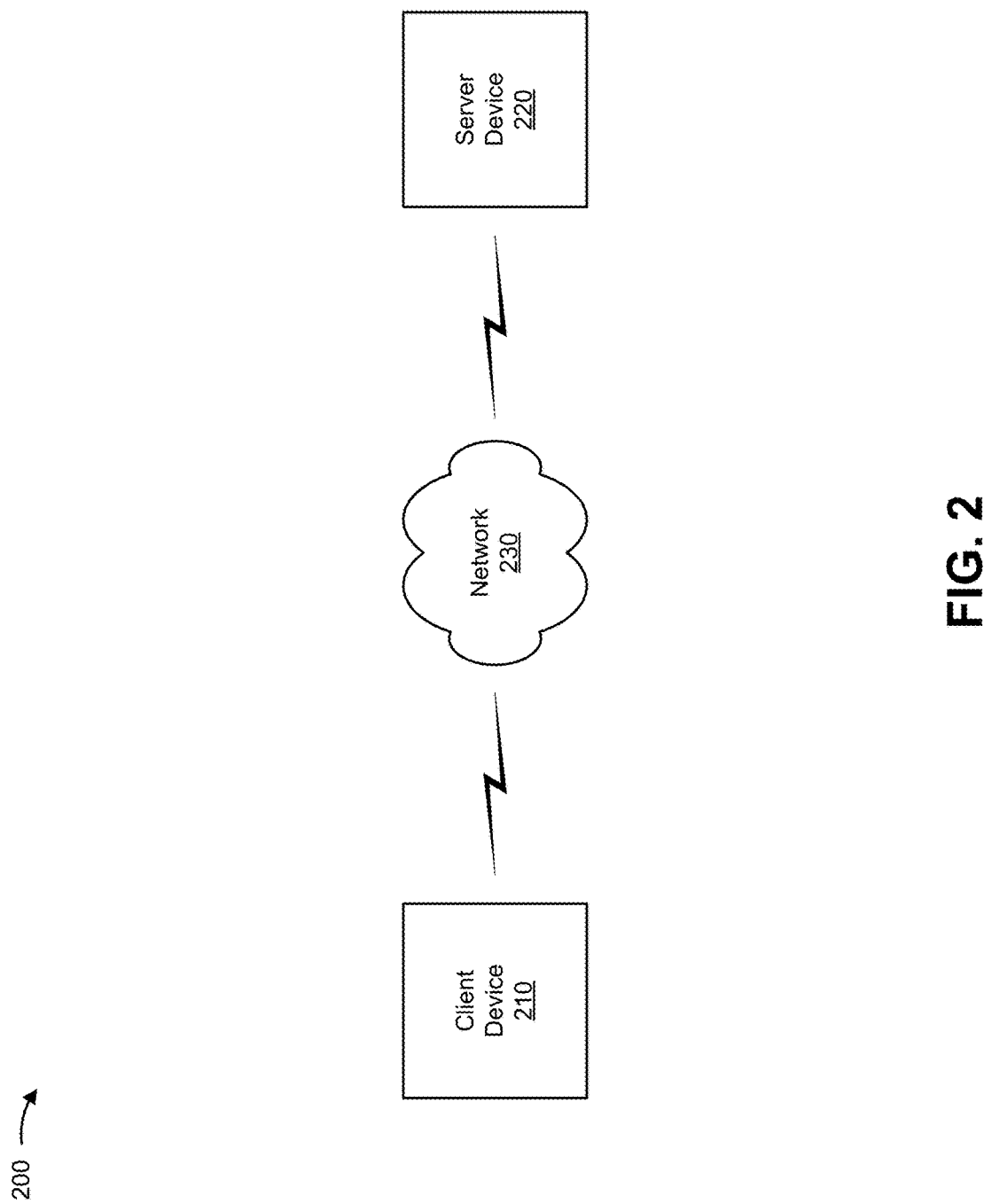
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a server device 220, and a network 230. Devices of environment 200 may interconnect via wired connections, wireless connections, or a combination of wired and wireless connections.

Client device 210 includes one or more devices capable of receiving, generating, storing, processing, and/or providing information and/or program code. For example, client device 210 may include a communication and/or computing device, such as a mobile phone (e.g., a smart phone, a radiotelephone, etc.), a laptop computer, a tablet computer, a desktop computer, or a similar type of device.

Server device 220 includes one or more devices capable of receiving, generating, storing, processing, and/or providing information and/or program code. For example, server device 220 may include a computing device, such as a server, a group of servers (e.g., in a data center, in a cloud computing environment, etc.), or the like.

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
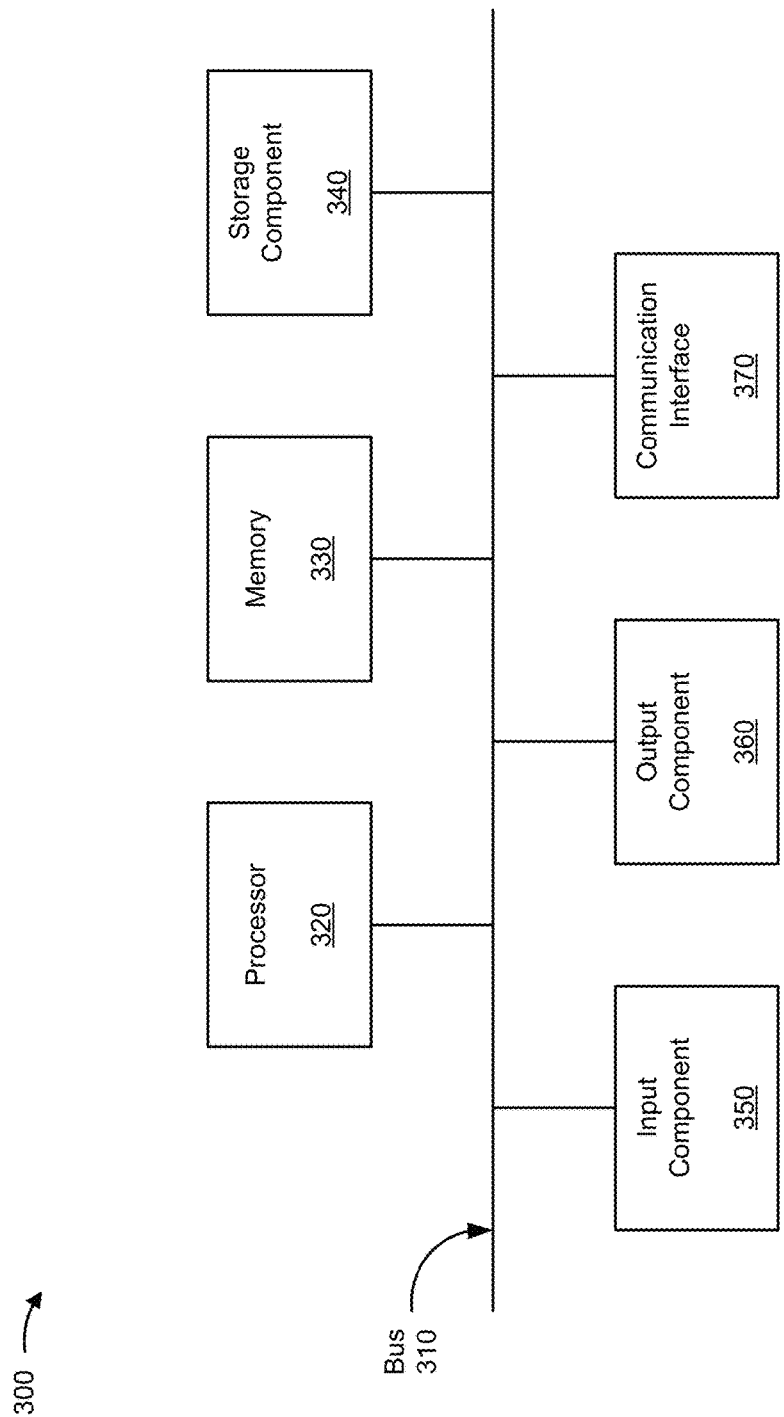
FIG. 3 is a diagram of example components of one or more devices of FIG. 2.

FIG. 3 is a diagram of example components of a device 300. Device 300 may correspond to client device 210 and/or server device 220. In some implementations, client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
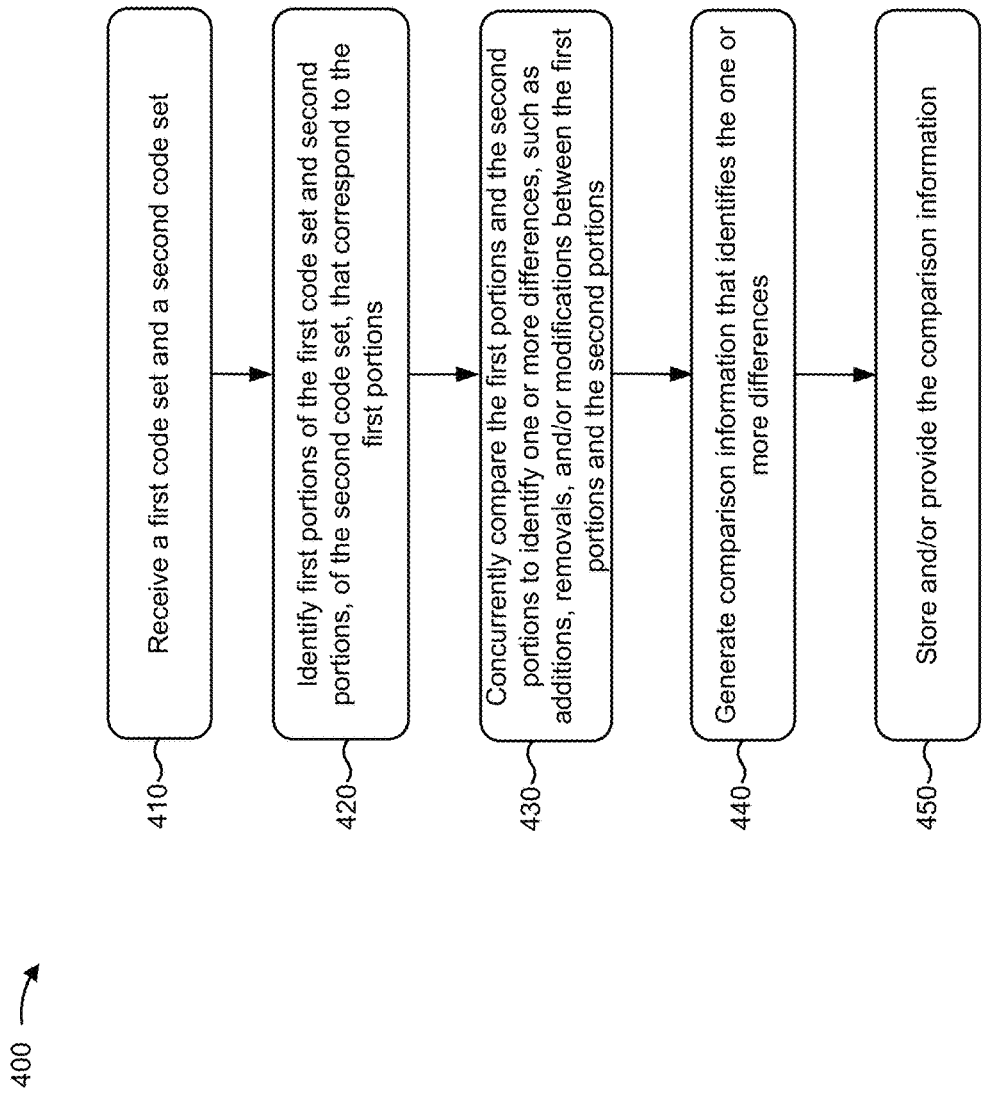
FIG. 4 is a flow chart of an example process for generating comparison information based on comparing a first code set and a second code set.

FIG. 4 is a flow chart of an example process 400 for generating comparison information based on comparing a first code set and a second code set. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving a first code set and a second code set (block 410). For example, client device 210 may receive a first code set and a second code set. In some implementations, client device 210 may receive the first code set and the second code set based on user input, may obtain the first code set and the second code set from storage, may receive the first code set and the second code set from another device, or the like. In some implementations, the first code set and second code set may be associated with the same programming language (e.g., Extensible Markup Language (XML), Structured Query Language (SQL), C, C++, C#, Ada, a Unix-based language, etc.). In some implementations, the first code set and the second code set may relate to an ETL process. In such a case, the first code set and/or the second code set may include one or more of a source definition portion, a target definition portion, a transformation portion, or the like, as described in more detail elsewhere herein.

The first code set and the second code set may have one or more differences (e.g., additions of code, removals of code, or modifications to code). For example, the second code set may be a modified version of the first code set, or the first code set may be a modified version of the second code set. As another example, the first code set and the second code set may be generated by different users (e.g., based on the same set of requirements). As yet another example, the first code set and the second code set may be associated with different environments or stages in a software development life cycle. In such a case, the first code set and the second code set may have different metadata (e.g., file names, labels, code comments, etc.) based on requirements associated with the different environments or stages.

In some implementations, a code set may include multiple, different portions of code. A portion of code may include one or more lines of code that are associated with a particular function or operation in an ETL process (e.g., a source data extraction process, one or more transformation processes or operations, a target data placement process, etc.). Additionally, or alternatively, a portion may include one or more lines of code that are associated with a particular format. As an example, source definition, target definition, workflow, and transformation portions of code are described in connection with FIGS. 1A-1C.

As other possible examples of portions of code, a code set relating to an ETL process may include any one or more of a source definition portion, a target definition portion, a transformation portion, a mapping portion, a session portion, a worklet portion, a mapplet portion, a workflow portion, or the like. A source definition portion may identify a structure and/or attributes of a source object from which data is to be extracted, underlying data types of a source object, an object type of a source object, or the like. A transformation portion may identify a manner in which source data is to be transformed, and/or may identify one or more functions that are to be applied during the transformation process. For example, a transformation portion may include one or more rules that define data flow and/or that identify how data is to be loaded to one or more targets. A target definition portion may identify a target data structure or file to which the data is to be loaded, and/or may describe characteristics of a target data structure or file.

A mapping portion may identify a set of source and target objects that are linked together by one or more transformations (i.e., transformation portions). A session portion may identify a time and/or manner (e.g., a bandwidth, a quantity of parallel processes, etc.) based on which to move data from a source object to a target object. A mapplet portion may include reusable mapping code, such as a script defining a mapping, a function defining a mapping, a file defining a mapping, or the like. For example, a mapplet may include a function handle that identifies a script or function corresponding to a particular mapping. A workflow portion may include a set of instructions that identify a manner in which to execute tasks (e.g., timers, decision blocks, wait instructions, etc.). A worklet portion may include reusable workflow code, such as a script defining a workflow, a function defining a workflow, a file defining a workflow, or the like. For example, a worklet may include a function handle that identifies a script or function corresponding to a particular workflow.

In some implementations, a pair of code sets (e.g., the first code set and the second code set) may have one or more corresponding portions. For example, the first code set and the second code set may both have a source definition portion, a transformation portion, a target definition portion, or the like. In some implementations, client device 210 may receive the portions together (e.g., as a single input, from a single file, etc.). In some implementations, client device 210 may receive the portions separately (e.g., as different inputs, from different files, etc.) and may combine the portions to form the code sets. By combining separate portions of program code for concurrent comparison, client device 210 may conserve processor resources that would otherwise be used to individually compare the portions.

As further shown in FIG. 4, process 400 may include identifying first portions of the first code set and second portions, of the second code set, that correspond to the first portions (block 420). For example, client device 210 may process the first code set and the second code set to identify first portions of the first code set and second portions of the second code set. In some implementations, client device 210 may identify the portions based on metadata included in the first code set and the second code set identifying the portions, based on functions included in the portions (e.g., based on whether the portions include functions related to extraction, related to transformation, or related to a loading process), based on a user input identifying the portions, based on the portions being included in particular files or types of files, based on comments included in the code sets (e.g., user comments that identify the portions), based on absolute locations and/or relative locations of the portions within the code sets (e.g., a line number), based on named objects included in the code sets (e.g., variable names, function names, class names, method names, etc.) or the like.

For example, assume that source portions of code sets generated by a particular platform (e.g., Informatica PowerCenter®, etc.) are identified by first metadata of "$sourcestart," that identifies a start of a source portion, and second metadata of "$sourceend," that identifies an end of the source portion. In such a case, client device 210 may identify the first metadata in a first portion and a second portion, and may identify the second metadata in the first portion and the second portion. Client device 210 may thereby identify the portions of the code set to be compared (i.e., the portion identified by the first metadata and the second metadata in the first code set, and the portion identified by the first metadata and the second metadata in the second code set).

As further shown in FIG. 4, process 400 may include concurrently comparing the first portions and the second portions to identify one or more differences, such as additions, removals, and/or modifications between the first portions and the second portions (block 430). For example, client device 210 may concurrently compare one or more first portions and one or more corresponding second portions to identify one or more differences between the one or more first portions and the one or more corresponding second portions (e.g., program code that has been added, removed, or modified). To concurrently compare the first portions, client device 210 may compare each of the first portions to each of the corresponding second portions based on performing parallel processing of the portions. In some implementations, client device 210 may concurrently compare each of the first portions to each of the corresponding second portions based on concatenating each of the first portions to form the first code set and concatenating each of the second portions to form the second code set. For example, client device 210 may receive information specifying particular portions to compare, may obtain the particular portions (e.g., from one or more code sets or files that include the particular portions), and may concatenate the particular portions to form the first code set and the second code set. Additionally, or alternatively, client device 210 may receive sets of program code of two or more programs, and may concurrently compare the sets of program code for each of the two or more programs (e.g., based on combining the two or more programs, etc.). In this way, client device 210 may reduce an amount of user interaction required to compare the code sets, thereby conserving processor resources.

A difference may relate to any property, characteristic, metadata, or value associated with the first code set and/or the second code set. For example, a difference may relate to a variable name, a column name, a data type, a data precision, a function name, a called function, a script of a function that may be replaced with another script, a lookup table, a source definition, a target definition, a column nullability indicator, a program name, a transformation name, a transformation type, a value name, a value, an expression, or the like.

To identify the one or more differences, client device 210 may identify program code that is different or that has been modified between the first code set and the second code set, or that is present in only one of the first code set or the second code set. When program code is present in the second code set and not in the first code set, client device 210 may identify an addition to the first code set. When program code is present in the first code set and not in the second code set, client device 210 may identify a removal from the first code set.

Client device 210 may identify a modification when a value of the first code set has been modified in the second code set, or when particular code is associated with a first state or value in a first code set, and is associated with a second state or value in a second code set. For example, client device 210 may identify a modification based on a variable in a function call being modified. As a second example, client device 210 may identify a modification based on a name of a data source being changed. As a third example, client device 210 may identify a modification based on a user changing one or more actions included in a workflow or transformation.

In some implementations, client device 210 may identify a difference based on a particular portion being added to or removed from a code set. For example, when client device 210 identifies a particular portion (e.g., a source definition portion, a target definition portion, a transformation portion, etc.) in the second code set and not in the first code set, client device 210 may determine that the particular portion has been added in the second code set. When client device 210 identifies a particular portion (e.g., a source definition portion, a target definition portion, a transformation portion, etc.) in the first code set and not in the second code set, client device 210 may determine that the particular portion has been removed from the first code set.

In some implementations, client device 210 may compare each portion included in the first code set to a corresponding portion of the second code set. In some implementations, client device 210 may compare a subset of the portions included in the first code set and the second code set. For example, client device 210 may receive information identifying particular portions to be compared, and may compare the particular portions. In some implementations, client device 210 may provide a graphical user interface that permits a user to select the particular portions to be compared. In this way, client device 210 conserves processor resources that would otherwise be used to compare each portion included in the first code set and the second code set.

As further shown in FIG. 4, process 400 may include generating comparison information that identifies the one or more differences (block 440). For example, client device 210 may generate comparison information that identifies the one or more differences between the first code set and the second code set. In some implementations, the comparison information may include a code comparison report, as described in greater detail below with respect to FIG. 5A-5C. Additionally, or alternatively, client device 210 may generate a code comparison report based on the comparison information. In some implementations, the comparison information may identify a location of the difference (e.g., a line number, a portion of the first code set or the second code set that includes the difference, a file name, etc.).

In some implementations, the comparison information may identify an object type of a particular object associated with the difference. For example, if client device 210 detects a difference in a source file name between the first code set and the second code set, the comparison information may identify an object type of "file name." Similarly, if client device 210 detects a difference in a function, the comparison information may identify an object type of "function." As another example, if client device 210 detects a difference in a variable value, the comparison information may identify an object type relating to the difference in the variable value. Additionally, or alternatively, the comparison information may identify an object type that is different in the first code set as compared to the second code set (e.g., a file format object type, a customized object type, etc.).

In some implementations, the comparison information may identify an original value and/or a modified value, and/or may include information identifying particular code that is associated with a difference. For example, if a pair of code sets includes a modification of a variable name from "source1" to "sourceA," the comparison information may identify an original variable name of "source1" and/or a modified variable name of "sourceA." As another example, if a pair of code sets includes a modification of metadata between the first code set and the second code set (e.g., a change in a code comment, a change in a tag associated with the first code set, a change in information identifying an author associated with the first code set, etc.), the comparison information may identify original values and/or modified values of the metadata (e.g., an original and/or modified code comment, a tag, an author, etc.).

In some implementations, client device 210 may not generate comparison information corresponding to a particular difference. Additionally, or alternatively, client device 210 may omit, from a code comparison report, comparison information pertaining to the particular difference. For example, client device 210 may receive (e.g., based on user input) information identifying a particular difference or a particular type of difference that is not to be identified in comparison information, and may omit, from a code comparison report, particular comparison information pertaining to the particular differences or the particular type of difference. In this way, client device 210 may conserve computing resources.

In some implementations, client device 210 may automatically determine comparison information to be omitted from a code comparison report (e.g., based on a particular portion of the code set in which the particular difference is included, based on the particular difference being detected a threshold quantity of times, etc.). Additionally, or alternatively, client device 210 may determine comparison information to be omitted from a code comparison report based on a user input. For example, assume that client device 210 receives information identifying a particular difference that is to be omitted from a code comparison report. In such a case, client device 210 may generate a code comparison report that omits comparison information corresponding to the particular difference.

As an example, when a code set is converted or migrated from a first software development environment to a second software development environment (e.g., a development environment, a quality assurance environment, a user acceptance environment, etc.), labels, names, metadata, comments, or other information associated with the code set may change based on the different software development environments. In such a case, client device 210 may omit, from the code comparison report, comparison information relating to differences caused by conversion from the first software development environment to the second software development environment. By omitting particular differences related to changing environments, client device 210 may conserve computing resources (e.g., processing resources, memory resources, etc.) that would otherwise be used to generate or provide comparison information that is related to the changing environments.

As further shown in FIG. 4, process 400 may include storing and/or providing the comparison information (block 450). For example, client device 210 may store and/or provide the comparison information. In some implementations, client device 210 may provide the comparison information for display. For example, client device 210 may generate a report that identifies the comparison information and/or the differences between the first code set and the second code set, and may provide the comparison information for display. In some implementations, the report may include visual cues to aid a user in interpreting the report. For example, the report may identify additions, deletions, and/or modifications based on color-coding. As another example, the additions, deletions, and/or modifications may be identified via icons, symbols, fonts, font styles, indicators, or the like. As yet another example, the additions, deletions, and/or modifications may be sorted in a particular manner, or may be identified via context and/or other information.

In some implementations, client device 210 may provide comparison information for a particular portion of a code set. For example, when comparing code sets with multiple, different corresponding portions, client device 210 may provide a code comparison report corresponding to each portion, may provide a code comparison report for a particular portion based on a user interaction to select the particular portion, may provide a code comparison report for each portion that includes at least one difference, or the like.

In some implementations, client device 210 may modify the first code set and/or the second code set based on the comparison information. For example, client device 210 may insert information into a code set based on the comparison information (e.g., tags, comments, etc.). As another example, client device 210 may re-insert code that has been removed from a particular code set, or may delete code that has been added to a particular code set.

In this way, a quantity of errors in program code is reduced, thereby improving performance of the program code and conserving processor resources. Additionally, by receiving multiple portions of code as input and concurrently comparing the multiple portions, processor resources are saved that would otherwise be used to individually or non-concurrently compare each of the multiple portions. Further, processing resources are conserved that would otherwise need to be used to generate and/or debug working code in the event that these techniques are not applied. Still further, implementations described herein may result in faster processing of code based on the code including fewer errors.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
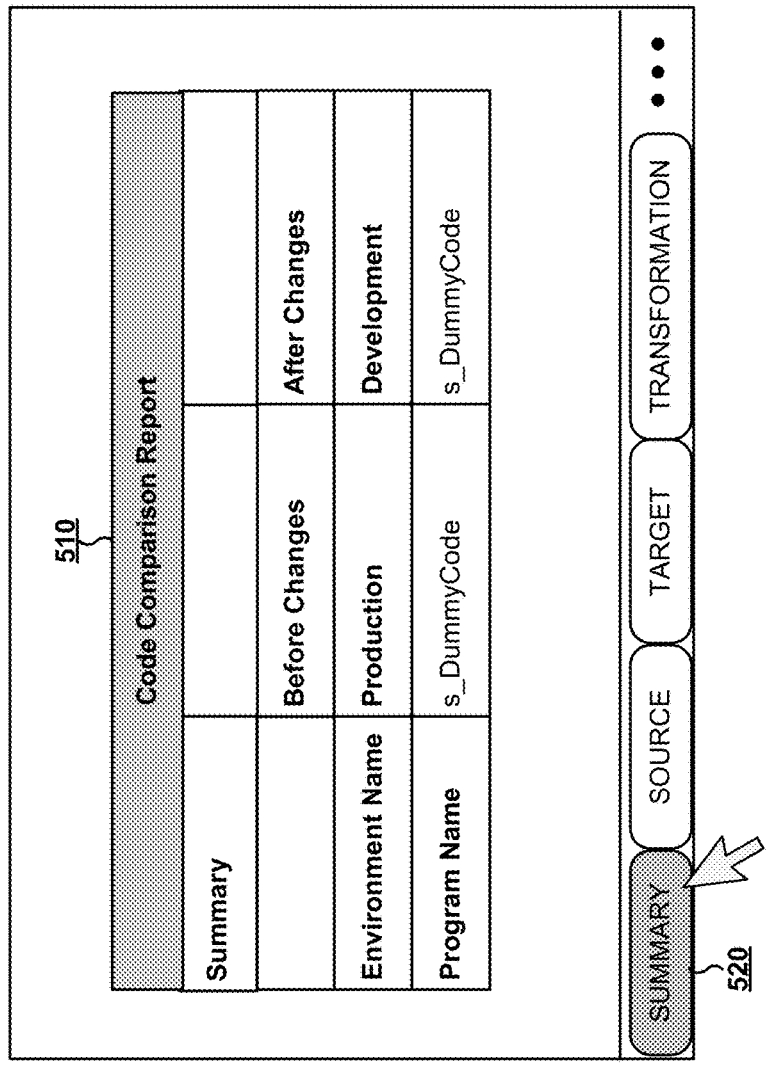
Figure 5B:
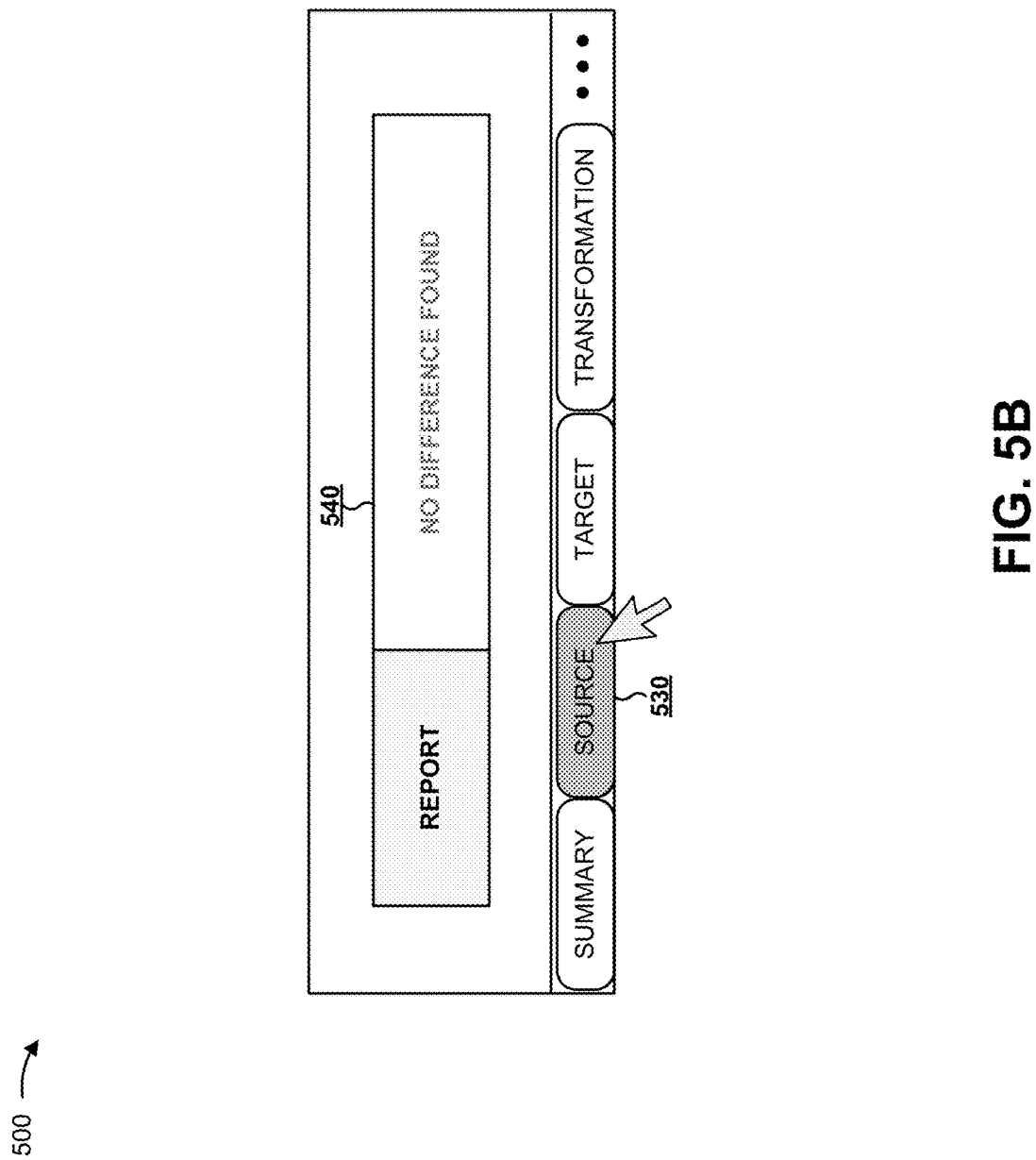

FIGS. 5A-5C are diagrams of an example implementation 500 relating to example process 400 shown in FIG. 4. FIGS. 5A-5C show an example of generating comparison information based on comparing a first code set and a second code set. For the purpose of FIGS. 5A-5C, assume that client device 210 has compared a first code set and a second code set to determine comparison information that identifies differences between the first code set and the second code set.

As shown in FIG. 5A, and by reference number 510, client device 210 may provide a code comparison report that includes a summary of the first code set and the second code set. As further shown in FIG. 5A, the first code set is associated with a name of "Before Changes," and the second code set is associated with a name of "After Changes." As shown, the first code set may be associated with a production environment (e.g., in a software development life cycle), and the second code set may be associated with a development environment (e.g., in the software development lifecycle). As shown by reference number 520, the code comparison report may include tabs relating to different portions of the first code set and the second code set (e.g., summary, source, target, transformation, etc.). The example of FIG. 5A shows the summary portion of the first code set and the second code set.

As shown in FIG. 5B, and by reference number 530, client device 210 may detect a user interaction with an element of a graphical user interface (e.g., a "source" button) to cause client device 210 to display the code comparison report pertaining to the source definition portion of the first code set and the second code set. As shown by reference number 540, client device 210 may display information indicating that no difference has been found in the source definition portion of the first code set and the second code set.

As shown in FIG. 5C, and by reference number 550, client device 210 may detect an interaction with an element of a graphical user interface (e.g., a "Transformation" button). Based on detecting the interaction, client device 210 may provide, for display, a code comparison report pertaining to transformation portions of the first code set and the second code set. The transformation portions of the code sets may identify transformations to apply based on mapping information that associates sources of data with targets for the data. Modifications, additions, and removals in the transformation portion may identify modifications to transformations, additions of transformations, and removals of transformations between the first data set and the second data set, respectively.

As further shown in FIG. 5C, and by reference number 560, the code comparison report may identify differences between the first code set and the second code set within the transformation portions. For example, the code comparison report may identify an action (e.g., modification, addition, or removal), a program name, a transformation name, a transformation type (e.g., source qualifier, expression, etc.), a value name, a value, a data type, and an expression to which the action applies. The "source qualifier" transformation type may convert source data to a target format. The "expression" transformation type may perform a transformation based on an expression. The "value" column may identify a value based on which to transform or convert data (e.g., an SQL query, as shown by reference number 570). The "expression" column may identify an expression based on which to perform the transformation (e.g., the expressions shown in the rightmost column of the code comparison report in FIG. 5C, as shown by reference number 580).

In some implementations, modifications to the code sets may be identified based on a visual cue. For example, as shown by reference numbers 570 and 580, modified code may be denoted by an underline font style (e.g., in which underlined text indicates text that has been added to an existing transformation). The additions identify transformations that were added to the transformation portion. Other font styles may be used to indicate modifications (e.g., a strikethrough font style for deleted text, etc.). Thus, client device 210 improves readability of the code comparison report and reduces a likelihood that a user misunderstands the code comparison report.

As indicated above, FIGS. 5A-5C are provided merely as an example. Other examples are possible and may differ from what was described with regard to FIGS. 5A-5C.

In this way, a quantity of errors in program code is reduced, thereby improving performance of the program code and conserving processor resources. Additionally, by receiving multiple portions of code as input and concurrently comparing the multiple portions, processor resources are saved that would otherwise be used to individually or non-concurrently compare each of the multiple portions. Further, processing resources are conserved that would otherwise need to be used to generate and/or debug working code in the event that these techniques are not applied. Still further, implementations described herein may result in faster processing of code based on the code including fewer errors.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, configured to:
  obtain a first code set and a second code set,
    the first code set having at least one difference from the second code set,
      the at least one difference relating to addition, removal, or modification of code of the first code set in comparison to code of the second code set, and
    the first code set and the second code set relating to one or more of:
      extracting input data from a source file,
      transforming the input data to form output data, or
      storing the output data in a target file;
  identify one or more code portions of the first code set and one or more code portions of the second code set,
    the one or more code portions of the first code set and the one or more code portions of the second code set including one or more lines of code that are associated with a particular format including at least one of:
      a source definition,
      a target definition,
      a workflow, or
      a transformation,
    each code portion of the first code set to be compared to a corresponding code portion of the second code set,
    the one or more code portions of the first code set including a first code portion and a second code portion and the one or more code portions of the second code set include a third code portion and a fourth code portion,
      the first code portion of the first code set corresponding to a format of the third code portion of the second code set,
      the second code portion of the first code set corresponding to a format of the fourth code portion of the second code set;
  concurrently compare:

the first code portion of the first code set to the third code portion of the of the second code set to identify at least a first difference, and the second code portion of the first code set to the fourth code portion of the second code set to identify at least a second difference, where the one or more processors, when concurrently comparing the first code portion of the first code set to the third code portion of the second code set and the second code portion of the first code set to the fourth code portion of the second code set, are to:

perform parallel processing with regard to comparing the first code portion to the third code portion and the second code portion to the fourth code portion;

generate comparison information identifying the at least first difference and the at least second difference; and store or provide the comparison information.

2. The device of claim 1, where the one or more processors, when generating the comparison information, are to:

generate information identifying particular code that is included in one or more of the first code set or the second code set, the at least one difference relating to addition, deletion, or modification of the particular code.

3. The device of claim 1, where the one or more processors are further to:

receive information identifying a particular difference that is to be omitted from the comparison information; and where the one or more processors, when storing or providing the comparison information, are to:

generate a report that includes the comparison information, the report excluding comparison information corresponding to the particular difference; and provide the report.

4. The device of claim 1, where the one or more processors, when identifying the one or more code portions of the first code set and the one or more code portions of the second code set, are to:

identify the one or more code portions of the first code set and the one or more code portions of the second code set based on at least one of:

functions included in the one or more code portions of the first code set and the one or more code portions of the second code set, metadata identifying the one or more code portions of the first code set and the one or more code portions of the second code set, or user input identifying the one or more code portions of the first code set and the one or more code portions of the second code set.

5. The device of claim 1, where the one or more processors, when generating the comparison information, are to:

determine that the first code portion, of the one or more code portions of the first code set, and the third code portion, of the one or more code portions of the second code set, are identical; and where the one or more processors, when providing the comparison information, are to:

provide information indicating that the first code portion and the third code portion are identical.

6. The device of claim 1, where the one or more processors, when obtaining the first code set and the second code set, are to:

obtain parts of the first code set from a first plurality of source objects; and obtain parts of the second code set from a second plurality of source objects;

generate the first code set based on the parts of the first code set; and generate the second code set based on the parts of the second code set.

7. The device of claim 1, where the one or more processors are further to:

provide a graphical user interface to permit a user to select particular portions of the first code set and the second code set to be compared.

8. A non-transitory computer-readable medium storing instructions, the instructions comprising:

one or more instructions that, when executed by one or more processors, cause the one or more processors to:

receive a first code set and a second code set, the first code set including one or more differences in comparison with the second code set, the one or more differences relating to addition, removal, or modification of code of the first code set in comparison to code of the second code set;

identify one or more first code portions included in the first code set and one or more code portions included in the second code set, the one or more code portions of the first code set and the one or more code portions of the second code set including one or more lines of code that are associated with a particular format including at least one of:

a source definition, a target definition, a workflow, or a transformation, each code portion, of the one or more code portions of the first code set, to be compared with a corresponding code portion of the one or more code portions of the second code set, the one or more code portions of the first code set including a first code portion and a second code portion and the one or more code portions of the second code set include a third code portion and a fourth code portion, the first code portion of the first code set corresponding to a format of the third code portion of the second code set, the second code portion of the first code set corresponding to a format of the fourth code portion of the second code set;

concurrently compare:

the first code portion of the first code set to the third code portion of the second code set to identify at least a first difference, and the second code portion of the first code set to the fourth code portion of the second code set to identify at least a second difference, where the one or more instructions, that cause the one or more processors to concurrently compare the first code portion to the third code portion and the second code portion to the fourth code portion, cause the one or more processors to:

perform parallel processing with regard to comparing the first code portion to the third code portion and the second code portion to the fourth code portion;

generate comparison information identifying the one or more differences at least first difference and the at least second difference; and
store or provide the comparison information.

9. The non-transitory computer-readable medium of claim 8, where the one or more instructions, when executed by the one or more processors, further cause the one or more processors to:
determine that the first code set is associated with a first software development environment;
determine that the second code set is associated with a second software development environment that is different than the first software development environment; and
where the one or more instructions, that cause the one or more processors to generate the comparison information, cause the one or more processors to:
determine particular comparison information identifying a particular difference, of the one or more differences, that is included in the first code set or the second code set based on the first code set and the second code set being associated with different software development environments; and
where the one or more instructions, that cause the one or more processors to store or provide the comparison information, cause the one or more processors to:
generate a report based on the comparison information, the report identifying the one or more differences and identifying code, of the first code set or the second code set, to which the one or more differences relate, and
the report not identifying the particular difference; and
provide the report.

10. The non-transitory computer-readable medium of claim 9, where the particular comparison information relates to metadata that is included in the first code set and the second code set,
the metadata being different in the first code set than in the second code set based on the first code set and the second code set being associated with the different software development environments.

11. The non-transitory computer-readable medium of claim 8, where the one or more instructions, that cause the one or more processors to generate the comparison information, cause the one or more processors to:
identify a particular object that was added to the first code set, modified in the first code set, or removed from the first code set based on the one or more differences; and
generate the comparison information to include information identifying the particular object.

12. The non-transitory computer-readable medium of claim 11, where the one or more instructions, that cause the one or more processors to generate the comparison information, cause the one or more processors to:
generate the comparison information to include information indicating whether the particular object was added to the first code set, removed from the first code set, or modified in the first code set.

13. The non-transitory computer-readable medium of claim 11, where the one or more instructions, that cause the one or more processors to generate the comparison information, cause the one or more processors to:
generate the comparison information to identify a particular value, included in or associated with the particular object, that is associated with the one or more differences.

14. The non-transitory computer-readable medium of claim 8, where the one or more instructions, that cause the one or more processors to provide the comparison information, further cause the one or more processors to:
provide the comparison information for display,
the comparison information including a visual cue to identify code that was added, removed, or modified.

15. A method, comprising:
obtaining, by a device, a first code set and a second code set,
the first code set including one or more differences in comparison with the second code set, and
the first code set and the second code set relating to one or more of:
extracting input data from a source file,
transforming the input data to form output data, or
storing the output data in a target file;
identifying, by the device, one or more code portions included in the first code set and one or more code portions included in the second code set,
the one or more code portions of the first code set and the one or more code portions of the second code set including one or more lines of code that are associated with a particular format including at least one of:
a source definition,
a target definition,
a workflow, or
a transformation,
each code portion of the first code set to be compared with a corresponding second code portion of the second code set,
the one or more code portions of the first code set including a first code portion and a second code portion and the one or more code portions of the second code set include a third code portion and a fourth code portion,
the first code portion of the first code set corresponding to a format of the third code portion of the second code set,
the second code portion of the first code set corresponding to a format of the fourth code portion of the second code set;
concurrently comparing, by the device;
the first code portion of the first code set to the third code portion of the second code set to identify at least a first difference, and
the second code portion of the first code set to the fourth code portion of the second code set to identify at least a second difference,
where concurrently comparing the first code portion to the third code portion and the second code portion to the fourth code portion comprises:
performing parallel processing with regard to comparing the first code portion to the third code portion and the second code portion to the fourth code portion;
generating, by the device, comparison information identifying the at least first difference and the at least second difference; and
storing or providing, by the device, the comparison information.

16. The method of claim 15, where a particular difference, of the one or more differences, relates to particular code that is included in the first code set and the second code set; and
where the comparison information identifies the particular code.

17. The method of claim 16, where the comparison information includes information identifying a first state of the particular code in the first code set; and
- where the comparison information includes information identifying a second state of the particular code in the second code set,
  - the particular code being modified in the second code set as compared to the first code set.

18. The method of claim 15, where the first code set is associated with a first software development environment; and
- where the second code set is associated with a second software development environment; and
- where storing or providing the comparison information comprises:
  - identifying particular comparison information that is associated with a difference between the first software development environment and the second software development environment; and
  - generating a report based on the comparison information,
    - the report excluding the particular comparison information; and
  - providing the report.

19. The method of claim 15, where obtaining the first code set and the second code set comprises:
- obtaining first parts of the first code set from a plurality of first objects;
- obtaining second parts of the second code set from a plurality of second objects; and
- combining the first parts to form the first code set; and
- combining the second parts to form the second code set.

20. The method of claim 15, further comprising:
- providing a graphical user interface to permit a user to select particular portions of the first code set and the second code set to be compared.

* * * * *

UNITED STATES PATENT AND TRADEMARK OFFICE
CERTIFICATE OF CORRECTION

PATENT NO. : 10,191,737 B2
APPLICATION NO. : 15/197156
DATED : January 29, 2019
INVENTOR(S) : Siddharth Suri It is certified that error appears in the above-identified patent and that said Letters Patent is hereby corrected as shown below:

In the Claims

In Claim 8, Column 18, Line 25, "identify one or more first code portions included in the" should be changed to -- identify one or more code portions included in the --.

In Claim 8, Column 19, Lines 1-2, "identifying the one or more differences at least first difference" should be changed to -- identifying the at least first difference --.

Signed and Sealed this
Ninth Day of June, 2020

Andrei Iancu
*Director of the United States Patent and Trademark Office*